United States Patent
Tomay et al.

(10) Patent No.: US 9,485,146 B1
(45) Date of Patent: *Nov. 1, 2016

(54) PROVIDING SERVICES USING A DEVICE CAPABILITIES SERVICE

(71) Applicant: Amazon Technologies, Inc., Reno, NV (US)

(72) Inventors: Beryl Tomay, Newcastle, WA (US); Ryan J. Snodgrass, Kirkland, WA (US); Samuel S. Gigliotti, Seattle, WA (US); Joel C. Hegg, Seattle, WA (US); Matthew E. Goldberg, Seattle, WA (US); Donald Ryan Willhoit, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/332,158

(22) Filed: Jul. 15, 2014

Related U.S. Application Data (63) Continuation of application No. 12/659,395, filed on Mar. 8, 2010, now Pat. No. 8,819,116.

(51) Int. Cl.
*G06F 15/173* (2006.01)
*G06F 15/16* (2006.01)
*H04L 12/24* (2006.01)

(52) U.S. Cl.
CPC ................................. *H04L 41/0866* (2013.01)

(58) Field of Classification Search
CPC .................................................... H04L 41/0866
USPC ......................................................... 709/223
See application file for complete search history.

(56) References Cited

U.S. PATENT DOCUMENTS

| | | | |
|---|---|---|---|
| 6,714,979 B1 | 3/2004 | Brandt et al. | |
| 7,127,541 B2 | 10/2006 | Govindarajulu et al. | |
| 7,448,040 B2 | 11/2008 | Ellis et al. | |
| 7,464,174 B1 | 12/2008 | Ngai | |
| 7,532,114 B2 | 5/2009 | Stilp | |
| 7,548,987 B2 | 6/2009 | Jabri et al. | |
| 7,555,570 B2 | 6/2009 | Hickey et al. | |
| 7,583,676 B2 | 9/2009 | Shobatake | |
| 7,664,081 B2 | 2/2010 | Luoma et al. | |
| 7,730,210 B2 | 6/2010 | Kuik et al. | |
| 7,769,893 B2 | 8/2010 | Goossens | |
| 7,783,613 B2 * | 8/2010 | Gupta | H04L 67/2823 707/693 |
| 7,788,663 B2 | 8/2010 | Illowsky et al. | |
| 7,805,564 B2 | 9/2010 | Matsunami et al. | |
| 7,814,174 B2 * | 10/2010 | Jerding | G06Q 30/06 709/219 |
| 7,814,533 B2 | 10/2010 | Devine et al. | |
| 7,844,687 B1 | 11/2010 | Gelvin et al. | |
| 7,886,033 B2 | 2/2011 | Hopmann et al. | |
| 8,200,259 B2 * | 6/2012 | Kupsh | H04L 12/5835 455/412.1 |

(Continued)

OTHER PUBLICATIONS

Final Office Action for U.S. Appl. No. 12/659,395, mailed on Oct. 14, 2011, Beryl Tomay, "Providing services using a device capabilities service", 14 pages.

*Primary Examiner* — Melvin H Pollack
(74) *Attorney, Agent, or Firm* — Lee & Hayes, PLLC (57) ABSTRACT

Systems and methods for providing a service to a device based on a capability of the device are described herein. A device type of the device may be identified based on information associated with the device. A determination may be made whether the device supports the service, based at least on the device type. The service may be provided to the device when the device supports the service.

20 Claims, 7 Drawing Sheets

(56) References Cited

U.S. PATENT DOCUMENTS

| | | | |
|---|---|---|---|
| 8,280,009 B2* | 10/2012 | Stepanian | G06F 21/10 348/14.04 |
| 8,578,076 B2* | 11/2013 | van der Linden | G06F 9/5077 709/227 |
| 8,626,598 B2* | 1/2014 | Wirola | G01S 19/05 705/26.1 |
| 8,706,160 B2* | 4/2014 | Lam | H04L 65/1069 455/552.1 |
| 8,874,701 B2* | 10/2014 | Guinard | G06F 9/5044 709/220 |
| 8,924,552 B2* | 12/2014 | Hjelm | H04L 69/24 709/219 |
| 2007/0150616 A1 | 6/2007 | Baek et al. | |
| 2009/0019141 A1 | 1/2009 | Bush et al. | |
| 2009/0232048 A1 | 9/2009 | Lynch, Jr. et al. | |
| 2009/0303926 A1 | 12/2009 | Den Hartog et al. | |
| 2010/0313225 A1* | 12/2010 | Cholas | H04N 7/17318 725/62 |
| 2011/0019650 A1 | 1/2011 | van Niekerk | |
| 2011/0138064 A1* | 6/2011 | Rieger | G06F 17/30905 709/228 |
| 2015/0135214 A1* | 5/2015 | Reisman | H04N 21/64322 725/37 |

* cited by examiner

FIG. 10 ary application of co-pending, commonly-owned U.S. patent application Ser. No. 12/659,395 entitled "Providing Services Using a Device Capabilities Service" filed Mar. 8, 2010, the content of which is incorporated by reference herein in its entirety.

PROVIDING SERVICES USING A DEVICE CAPABILITIES SERVICE

CROSS-REFERENCE TO RELATED APPLICATION

This patent application is a continuation application of co-pending, commonly-owned U.S. patent application Ser. No. 12/659,395 entitled "Providing Services Using a Device Capabilities Service" filed Mar. 8, 2010, the content of which is incorporated by reference herein in its entirety.

BACKGROUND

Online entities offer a wide variety of electronic content and services to a variety of different devices, including personal computers (PCs), electronic book viewers, portable digital assistants (PDAs), mobile telephones, pocket PCs, smart phones, televisions, set-top boxes, digital video recorders (DVRs), and gaming consoles. These devices often access various web pages and web services, such as those associated with online stores or other providers of audio/visual content, software programs, digital books, or other electronic content. Further, these devices generally incorporate a wide variety of hardware and include a wide variety of operating systems and software applications.

For example, processes that provide access to electronic content and services generally require a user of a device to access a login page and enter authentication credentials, including a user name and/or a password, prior to completing a request for electronic content or services. However, these processes are generally unable to discern whether a combination of hardware and software associated with a particular device supports the requested electronic content. These processes, in general, merely provide the requested electronic content to the device, while leaving to the user the task of determining whether the device supports the electronic content.

Further, even a user who is familiar with the capabilities and features of a device may be unable to easily identify electronic content supported by the device. For example, web pages and services associated with providers may organize electronic content and services according to title or functionality, but not according to a file format associated with the electronic content, specific hardware and/or software applications required by the electronic content or services, or other parameters indicative of whether the device supports the electronic content. Although capable of accessing web pages and services to obtain electronic content, many devices may be unable to easily parse the displayed data to identify supported electronic content based on specific software-related or hardware-related features. Therefore, systems and methods are needed to overcome the limitations of traditional processes that provide electronic content and services to devices.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions, or modifications may be made to the components illustrated in the drawings, and the exemplary methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide computer-implemented systems and methods for providing a service based on a device capability. For example, a fulfillment server may be in communication with a device management server and a device capabilities server to provide the service to one or more devices across a network based on the device capability.

According to disclosed embodiments, a fulfillment server may identify a device type associated with a device based on at least information associated with the device. For example, information associated with the device may include, but is not limited to, information that uniquely identifies a user of the device, e.g., an account number, personal identification number, or login credential of the user.

In an embodiment, the fulfillment server may transmit the information identifying the user over the network to a device management server, which retrieves device-specific information identifying the device of the user, and which transmits the retrieved device-specific information to the fulfillment server. For example, the device-specific information may include a device type associated with the user-specific information. Further, in additional embodiments, the device-specific information may include additional information associated with the device, including, but not limited to, an operating system installed at the device, one or more application programs supported by the operating system, and one or more hardware components of the device.

The fulfillment server may further identify a capability associated with a service, and may transmit the identified capability and the device-specific information to a device capabilities server. For example, the identified attribute may include, but is not limited to, a file format of the requested content, a particular software program associated with the identified attribute, and a specific hardware component associated with the requested content.

In an embodiment, the device capabilities server may transmit a response to the fulfillment server indicative of whether the identified capability is associated with the device-specific information. Based on the response from the device capabilities server, the fulfillment server may determine whether the device supports the service. The fulfillment server may subsequently provide the service to the device when the device supports the service.

In an embodiment, the provided service may include one or more of providing content to the device, authenticating the device, communicating with the device, granting permission to the device to perform an action, and providing error and information messages to the device. The device capability may include one or more of an indication of allowable content, a communications mechanism, a content delivery mechanism, software executed by the device, a security protocol, a location-based protocol, a user-based protocol, and a device-based protocol.

Consistent with a disclosed embodiment, a computer-implemented method provides a service based on a device capability. The method includes identifying a device type corresponding to a device, based on at least information associated with the device. The information associated with the device includes one or more of an account number of a user of the device, an identification number of the user of the device, a manufacturer of the device, and a model or serial number of the device. The method determines whether the device supports the service, based on at least the device type. The determination includes identifying a capability that is associated with the service, and transmitting at least the device type and the capability to a server, the server storing information associated with the device type. The determination also includes receiving, from the server, a response indicating whether the device type is associated with the capability, and determining whether the device supports the service based on at least the response. The service is provided to the device when the device supports the service. The service includes one or more of providing content to the device, authenticating the device, and communicating with the device. The capability includes one or more of an indication of allowable content, a communications mechanism, a content delivery mechanism, software executed by the device, a security protocol, a location-based protocol, a user-based protocol, and a device-based protocol.

Consistent with another disclosed embodiment, a computer-implemented method provides a service. The method includes identifying a device type corresponding to a device, based on the information associated with the device. The method determines whether the device supports the service, based on at least the device type. The determination includes transmitting, to a server, at least the device type and a capability that is associated with the service, the server storing information associated with the device type, and receiving, from the server, a response indicating whether the device supports the service. The service is provided to the device when the device supports the service.

Consistent with yet another disclosed embodiment, a computer-implemented method is provided for determining a capability of a device. The method includes receiving, from a server, information associated with the device and the capability. The method retrieves a record associated with the received information, and determines, based on the record, whether the information is associated with the capability. A response is then transmitted to the server indicating whether the device is associated with the capability.

Consistent with a further disclosed embodiment, an apparatus provides a service. The apparatus includes a processor for executing program instructions, and a memory storing the program instructions. The program instructions are executed by the processor to perform a process to identify a device type corresponding to a device, based on at least information associated with the device, and to determine whether the device supports the service, based on at least the device type. The program instructions executed by the processor to determine are further executed to transmit, to a server, at least the device type and a capability that is associated with the service, the server storing information associated with the device type, and to receive, from the server, a response indicating whether the device supports the service. The service is provided to the device when the device supports the service.

Consistent with other disclosed embodiments, computer-readable media are provided that store a set of instructions that, when executed on a processor, perform a method for providing a service. A device type corresponding to a device is identified based on based on at least the information associated with the device. The method determines whether the device supports the service, based on at least the device type. The determination includes transmitting, to a server, at least the device type and a capability that is associated with the service, the server storing information associated with the device type, and receiving, from the server, a response indicating whether the device supports the service. The service is provided to the device when the device supports the service.

Figure 1:
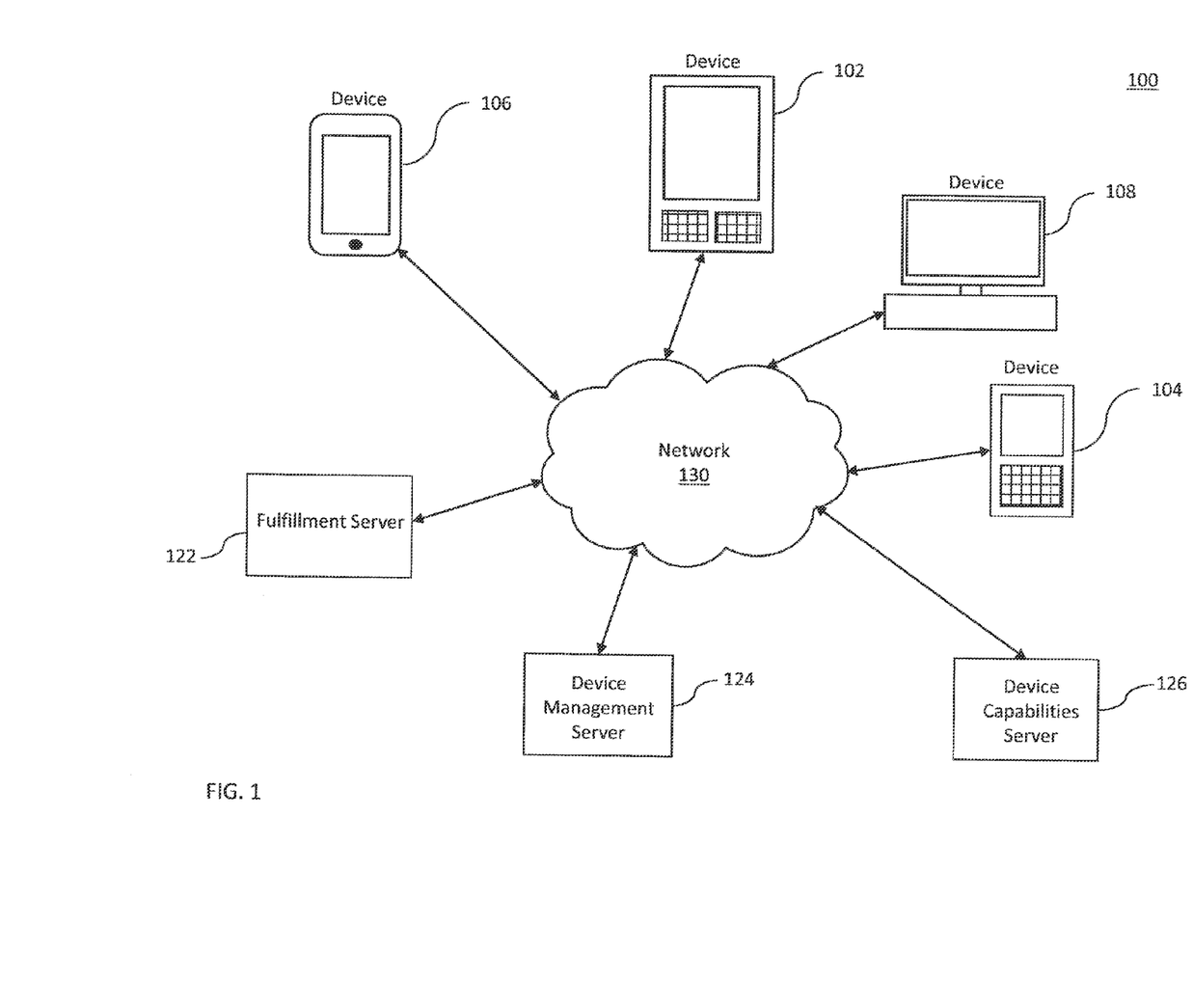
FIG. 1 is a diagram of an exemplary architecture of a system that provides electronic content based on a device capability.

FIG. 1 is a diagram of an exemplary architecture for a computing system 100 that provides a service based on a device capability, consistent with disclosed embodiments. System 100 may provide functionality for providing a service to a device when the device supports the service.

In FIG. 1, system 100 includes devices 102, 104, 106, and 108, fulfillment server 122, device management server 124, and device capabilities server 126, which are interconnected via a network 130. One of skill in the art will appreciate that although three devices, a single fulfillment server, a single device management server, and a single device capabilities server are depicted in FIG. 1, system 100 may include any additional or alternate number of these components. Furthermore, one of ordinary skill in the art will recognize that one or more of the components of system 100 may be combined and/or divided into subcomponents. For example, device management server 124 and device capabilities server 126 may represent be integrated into one or more modules of fulfillment server 122.

Network 130 may represent any form or medium of digital data communication. Examples of network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet, a private network, and an intranet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, network 130 may also include one or more mobile device networks, such as a GSM network or a PCS network, that allow mobile devices to send and receive data across network 130 via applicable communications protocols, including those described above.

Fulfillment server 122, device management server 124, and device capabilities server 126 may each comprise a general purpose computer (e.g., a personal computer, network computer, server, or mainframe computer) having one or more processors that may be selectively activated or reconfigured by a computer program. Further, one or more of fulfillment server 122, device management server 124, and device capabilities server 126 may be implemented in a distributed network. For example, any of fulfillment server 122, device management server 124, and device capabilities server 126 may communicate via network 130 with one or more additional servers (not shown), which may enable servers 122, 124, and 126 to distribute processes for parallel execution by a plurality of other servers. Additional details regarding fulfillment server 122, device management server 124, and device capabilities server 126 are discussed below in reference to FIGS. 3, 4, and 6.

Devices 102, 104, 106, and 108 may each comprise a general purpose computer, as described above. However, in additional embodiments, devices 102, 104, 106, and 108 may constitute a personal digital assistant (PDA), a portable navigation device, a mobile phone, a smart phone, an electronic book viewer, and any additional or alternate computing device apparent to a person of ordinary skill in the art and operable to transmit and receive data across network 130. Moreover, such devices may also include a number of additional devices configured to transmit and receive data across network 130 including, but not limited to, a television, a set-top box in communication with a television, a digital video recorder (DVR), and a gaming console. Additional information regarding devices 102, 104, 106, and 108 are provided below in reference to FIG. 2.

Figure 2:
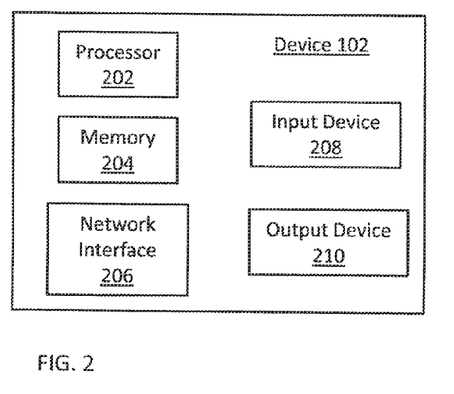
FIG. 2 is a diagram of an exemplary device.

FIG. 2 is a diagram of an exemplary architecture of device 102, consistent with a disclosed embodiment. Although the following discussion refers to device 102, devices 104, 106, and 108 may include components equivalent to those discussed below in connection with FIG. 2.

As shown in FIG. 2, device 102 may include a processor 202, a memory 204, a network interface 206 for communicating via network 130, an input device 208, and an output device 210. Processor 202 may include one or more processors (e.g., a CPU) configured to execute instructions and to process data to perform one or more functions associated with system 100. For example, processor 202 may be configured to execute instructions to perform one or more of the computer-implemented methods described below in reference to FIGS. 8, 9, and 10.

Memory 204 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art. Memory 204 may store an operating system, such as DOS, Windows, or Linux, and may also include one or more application programs, such as word processing, database programs, spreadsheet programs, presentation programs, and graphics programs, and/or other programs capable of generating documents or other electronic content. Further, in an embodiment, memory 204 may also include browser applications capable of rendering standard Internet content, such as Netscape Navigator, Microsoft Internet Explorer, and/or Mozilla Firefox.

In an embodiment, processor 202 may leverage and execute the operating system, the application programs, and/or the browser applications in connection with the disclosed processes. The application programs may be implemented using applets, plug-ins, modules, and/or any other software components known in the art.

Network interface 206 may include any communication device for sending and receiving data across network 130. For example, network interface 206 may include a modem, a transceiver, a network communication card, a satellite dish, an antenna, or another network adapter capable of transmitting and receiving data over network 130.

Input device 208 and output device 210 may include one or more components that allow a user of device 102 to interface with applications executing on device 102. For example, input device 208 may include devices such as a keyboard, a keypad, a mouse, a touch pad, a touch screen, a microphone, an accelerometer, and/or any other user input device apparent to one of ordinary skill in the art and consistent with device 102. Output device 210 may include, but is not limited to, a display (e.g., an LCD, a CRT display, or a plasma display), a printer, a speaker, and/or any other output device apparent to one or ordinary skill in the art and consistent with device 102.

Figure 3:
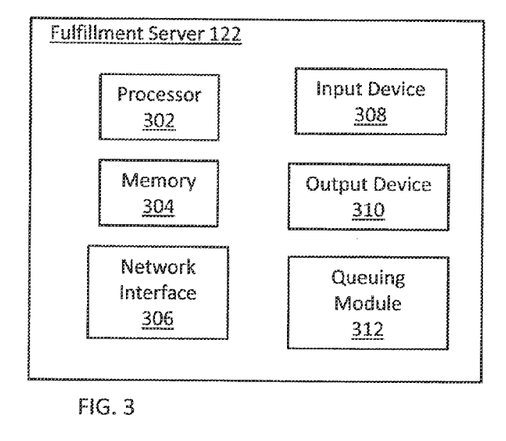
FIG. 3 is a diagram of an exemplary architecture of a fulfillment server.

FIG. 3 is a diagram of an exemplary architecture of fulfillment server 122, consistent with disclosed embodiments. As shown in FIG. 3, fulfillment server 122 may include a processor 302, a memory 304, a network interface 306 for communicating via network 130, an input device 308, and an output device 310. Processor 302 may include one or more processors (e.g., a CPU) configured to execute instructions and to process data to perform one or more functions associated with system 100. For example, processor 302 may be configured to execute instructions to perform one or more of the computer-implemented methods described below in reference to FIGS. 8, 9, and 10.

Memory 304 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art. Memory 304 may store an operating system, such as DOS, Windows, or Linux, and one or more applications for performing the disclosed processes, which may be executed by processor 302. The applications may be implemented using applets, plug-ins, modules, and/or any other software components known in the art.

In an embodiment, fulfillment server 122 may include functionality that provides a service to devices 102, 104, 106, and 108 based on capabilities associated with these devices. A service may include any function, data, permission, or response provided to a device. For example, services may include, but are not limited to, providing electronic content to devices 102, 104, 106, and 108, authenticating devices 102, 104, 106, and 108, communicating with devices 102, 104, 106, and 108, granting permission to devices 102, 104, 106, and 108 to perform a function, transmitting error and informational messages to devices 102, 104, 106, and 108, and any additional or alternate service apparent to one of skill in the art.

For example, fulfillment server 122 may provide electronic content to devices 102, 104, 106, and 108. In such an embodiment, fulfillment server 122 may be associated with an online retailer or content provider, and memory 304 may store information associated with one or more items, e.g., electronic content or services, of a catalog associated with the online retailer or content provider. Such information may include, but is not limited to, an identifier of each item, e.g., a product number or a UPC code, an image of each item, a description of each item, a price of each item, and any additional or alternate information apparent to one of ordinary skill in the art.

Network interface 306 may include any communication device for sending and receiving data. For example, network interface 306 may include a modem, a transceiver, a network communication card, a satellite dish, an antenna, or another network adapter capable of transmitting and receiving data over network 130.

Input device 308 and output device 310 may include one or more components that allow a user of fulfillment server 122 to interface with applications executing on fulfillment server 122. For example, input device 308 may include devices such as a keyboard, a keypad, a mouse, a touch pad, a touch screen, a microphone, an accelerometer, and/or any other user input device apparent to one of ordinary skill in the art and consistent with fulfillment server 122. Output device 310 may include, but is not limited to, a display (e.g., an LCD, a CRT display, or a plasma display), a printer, a speaker, and/or any other output device apparent to one or ordinary skill in the art and consistent with fulfillment server 122.

Fulfillment server 122 may also be associated with a queuing module 312. For example, queuing module 312 may receive requests for services from one or more of devices 102, 104, 106, and 108, and may broker and complete the received requests in an order in which the requests are received. In an embodiment, queuing module 312 may constitute an additional hardware component or module of fulfillment server 122, or alternatively, an additional general-purpose computer distinct from fulfillment server 122 and in communication with fulfillment server 122 across network 130.

Figure 4:
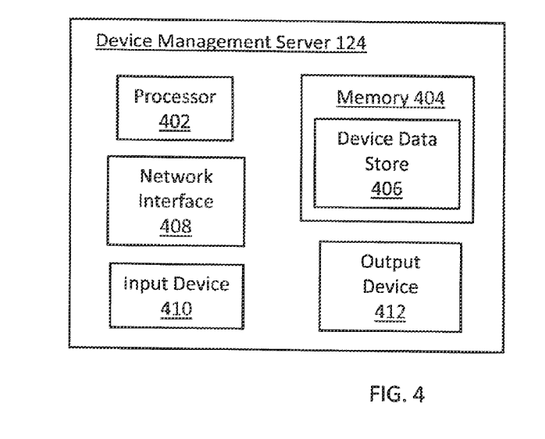
FIG. 4 is a diagram of an exemplary architecture of a device management server.

FIG. 4 is a diagram of an exemplary architecture of device management server 124, consistent with a disclosed embodiment. In FIG. 4, device management server 124 may include a processor 402, a memory 404, a network interface 408 for communicating via network 130, an input device 410, and an output device 412. Processor 402 may include one or more processors (e.g., a CPU) configured to execute instructions and to process data to perform one or more functions associated with system 100. For example, processor 402 may be configured to execute instructions to perform one or more of the computer-implemented methods described below in reference to FIGS. 8, 9, and 10.

Memory 404 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art. Memory 404 may store an operating system, such as DOS, Windows, or Linux, and one or more applications for performing the disclosed processes, which may be executed by processor 402. The applications may be implemented using applets, plug-ins, modules, and/or any other software components known in the art.

Figure 5:
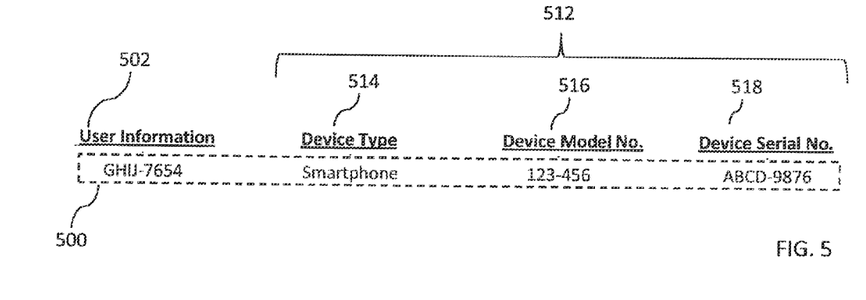
FIG. 5 is a diagram of an exemplary data structure associated with the device management server.

Memory 404 may include a device data store 406 that includes, for example, information linking a user to a particular device within system 100. In an embodiment, device data store 406 may include a plurality of individual data records associated with respective devices of system 100, such as data record 500 of FIG. 5. As depicted in FIG. 5, data record 500 includes user information 502, which uniquely identifies a user of a device (e.g., device 102), and device information 512, which identifies device 102.

For example, device information 512 may include, but is not limited to, a device type 514, a device model number 516, and a device serial number 518, or any subset thereof. As depicted in FIG. 5, data record 500 refers to device 102 having a device type of "Smartphone," a device model number of "123-456," and a device serial number of "ABCD-9876." However, in additional embodiments, device information 512 may include a subset of this information, or additional or alternate information apparent to one of ordinary skill in the art and appropriate to the device, e.g., a manufacturer of the device, a geographic region associated with the device, or a date of manufacture associated with the device.

As depicted in FIG. 5, user information 502 may include an account number, for example, that links the user to an online retailer associated with fulfillment server 122. For example, the user of device 102 having device type 514, i.e., "Smartphone," is linked to account number "GHIJ-7654," in data record 500. However, in additional embodiments, user information 502 may include any additional or alternate information that uniquely identifies the user of the device, including, but not limited to, a unique personal identification number and a login credential linking the user to fulfillment server 122.

Further, in an embodiment, the user of device 102 may create data record 500 by registering device 102 with device management server 124 at, for example, a time of purchase, a time of software upgrade, at a time of hardware upgrade, or at a time of the user's choosing. For example, and as discussed above, an application program executing on device 102 may transmit user information and device information necessary to populate data record 500 automatically, or alternatively, in response to a prompt to the user for data entry.

Referring back to FIG. 4, input device 410 and output device 412 may include one or more components that allow a user of fulfillment server 122 to interface with applications executing on fulfillment server 122. For example, input device 410 may include devices such as a keyboard, a keypad, a mouse, a touch pad, a touch screen, a microphone, an accelerometer, and/or any other user input device apparent to one of ordinary skill in the art and consistent with fulfillment server 122. Output device 412 may include, but is not limited to, a display (e.g., an LCD, a CRT display, or a plasma display), a printer, a speaker, and/or any other output device apparent to one or ordinary skill in the art and consistent with device management server 124.

Network interface 408 may include any communication device for sending and receiving data. For example, network interface 408 may include a modem, a transceiver, a network communication card, a satellite dish, an antenna, or another network adapter capable of transmitting and receiving data over network 130.

As shown in FIG. 4, device data store 406 forms a portion of memory 404. However, in additional embodiments, device data store 406 may be included within one or more external memory devices in communication with device management server 124 via network 130 using, for example, network interface 408.

Figure 6:
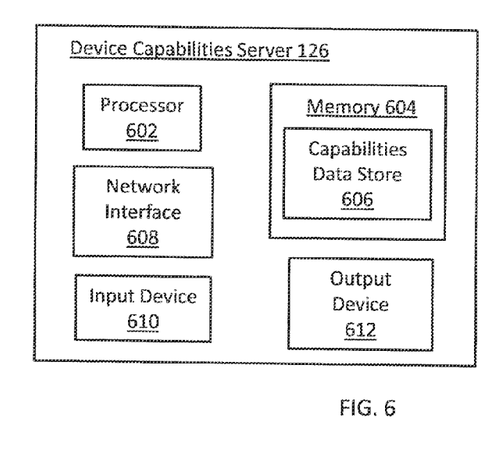
FIG. 6 is a diagram of an exemplary architecture of a device capabilities server.

FIG. 6 is a diagram of an exemplary architecture of device capabilities server 126, consistent with a disclosed embodiment. In FIG. 6, device capabilities server 126 may include a processor 602, a memory 604, a network interface 608 for communicating via network 130, an input device 610, and an output device 612. Processor 602 may include one or more processors (e.g., a CPU) configured to execute instructions and to process data to perform one or more functions associated with system 100. For example, processor 602 may be configured to execute instructions to perform one or more of the computer-implemented methods described below in reference to FIGS. 8, 9, and 10.

Memory 604 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art. Memory 604 may store an operating system, such as DOS, Windows, or Linux, and one or more applications for performing the disclosed processes, which may be executed by processor 602. The applications may be implemented using applets, plug-ins, modules, and/or any other software components known in the art.

Figure 7:
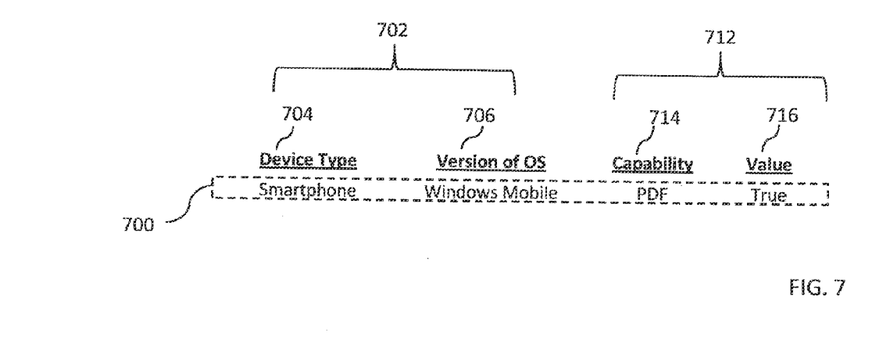
FIG. 7 is a diagram of an exemplary data structure associated with the device capabilities server.

Memory 604 may also include a capabilities data store 606 that includes, for example, information that identifies capabilities of devices within system 100 (e.g., devices 102, 104, 106 and 108). In an embodiment, capabilities data store 606 may include a plurality of individual data records associated with respective devices of system 100, such as data record 700 of FIG. 7. As depicted in FIG. 7, data record 700 includes device information 702, which identifies a device within system 100 (e.g., device 102), and capabilities information 712, which includes one or more capabilities linked to device information 702.

For example, device information 702 may include, but is not limited to, a device type 704, a version 706 of an operating system supported by device type 702, or any subset thereof. For example, as depicted in FIG. 7, data record 700 refers to a device having a device type of "Smartphone," that executes a version of a "Windows Mobile" operating system. However, in additional embodiments, device information 702 may include any additional or alternate information apparent to one of ordinary skill in the art and appropriate to the device, e.g., one or more application programs supported by version 706 of the operating system, and a particular hardware configuration of device type 702.

Further, capability information 712 may include information specifying one or more capabilities associated with device information 702. In an embodiment, the capabilities specified within capabilities information 712 may indicate an ability of device 102 to receive, access, view, edit, save, or otherwise process a particular variety of electronic content, e.g., available from fulfillment server 122. For example, the supported capability may indicate whether device 102 is compatible with a particular file format (e.g., a PDF file), whether device 102 can download specific electronic content (e.g., electronic books, newspapers, or magazines), whether device 102 supports content presented at a specific visual resolutions, and whether device 102 is compatible with specific security protocols.

In an additional embodiment, capabilities information 712 may be directed to one or more communications mechanisms or content delivery mechanisms compatible with device 102. For example, capability information 712 may indicate whether device 102 supports file transfer by USB connection, whether device 102 supports streaming media content (e.g., streaming Flash media), and whether device 102 support Wi-Fi communications protocols.

Further, capability information 712 may indicate whether device 102 can transmit and receive messages according to a short messaging service (SMS) protocol, a multimedia messaging service (MMS) communications protocol, or any additional or alternate wireless communications protocol apparent to one of skill in the art. Capabilities information 712 may also indicate whether device 102 can transmit or receive electronic messages, including, but not limited to, email messages, messages transmitted through a social networking and/or micro-blogging service, e.g., Facebook or Twitter.

However, capabilities information 712 is not limited to indications of allowable content or communications and communications mechanisms. For example, capabilities information 712 may also include, but is not limited to, features of software supported by device 102, security protocols associated with device 102, location specific capabilities and limitations (e.g., an ability to download and/or transmits files in certain geographical regions or countries), connection-specific capabilities and limitations (e.g., an ability to downloaded electronic content when device 102 is roaming or has a poor signal), user-specific capabilities and limitations (e.g., customer preferences), device-specific capabilities and limitations, or any additional or alternate capability apparent to one of skill in the art.

In an embodiment, an administrator may establish one or more of the capabilities specified in capabilities information 712. However, in additional embodiments, a device, e.g., device 102, may publish a set of capabilities specific to the device, which may be accessed and automatically included within capabilities information 712.

As depicted in FIG. 7, device information 702 is linked to capability 714 having a corresponding value 716. For example, data record 700 indicates that capability 714 represents an ability to read a "PDF" file, and value 716 of capability 714 is "True." In such an embodiment, a device type of "Smartphone" running a 'Windows Mobile" operating system is capable of viewing PDF content.

In an embodiment, a user with administrative privileges (e.g., an administrator of device capabilities server 124) may generate data record 700 to link device information 702 with corresponding capabilities information 712, or may update one or more of device information 702 and capabilities information 712 of data record 700, in response to software updates to devices, hardware updates to devices, or any additional or alternate stimulus apparent to one of skill in the art. For example, a developer may generate a new application for one or more devices operating within system 100 and, in response to the new application, the administrator may update the data records associated with the devices in system 100 to indicate whether this application is compatible with the devices.

Referring back to FIG. 6, input device 610 and output device 612 may include one or more components that allow a user of device capabilities server 126 to interface with applications executing on device capabilities server 126. For example, input device 610 may include devices such as a keyboard, a keypad, a mouse, a touch pad, a touch screen, a microphone, an accelerometer, and/or any other user input device apparent to one of ordinary skill in the art and consistent with device capabilities server 126. Output device 612 may include, but is not limited to, a display (e.g., an LCD, a CRT display, or a plasma display), a printer, a speaker, and/or any other output device apparent to one or ordinary skill in the art and consistent with device capabilities server 126.

Network interface 608 may include any communication device for sending and receiving data. For example, network interface 608 may include a modem, a transceiver, a network communication card, a satellite dish, an antenna, or another network adapter capable of transmitting and receiving data over network 130.

In an embodiment, capabilities data store 606 forms a portion of memory 604. However, in additional embodiments, capabilities data store 606 may be included within one or more external memory devices in communication with device capabilities server 126 via network 130 using, for example, network interface 608.

Figure 8:
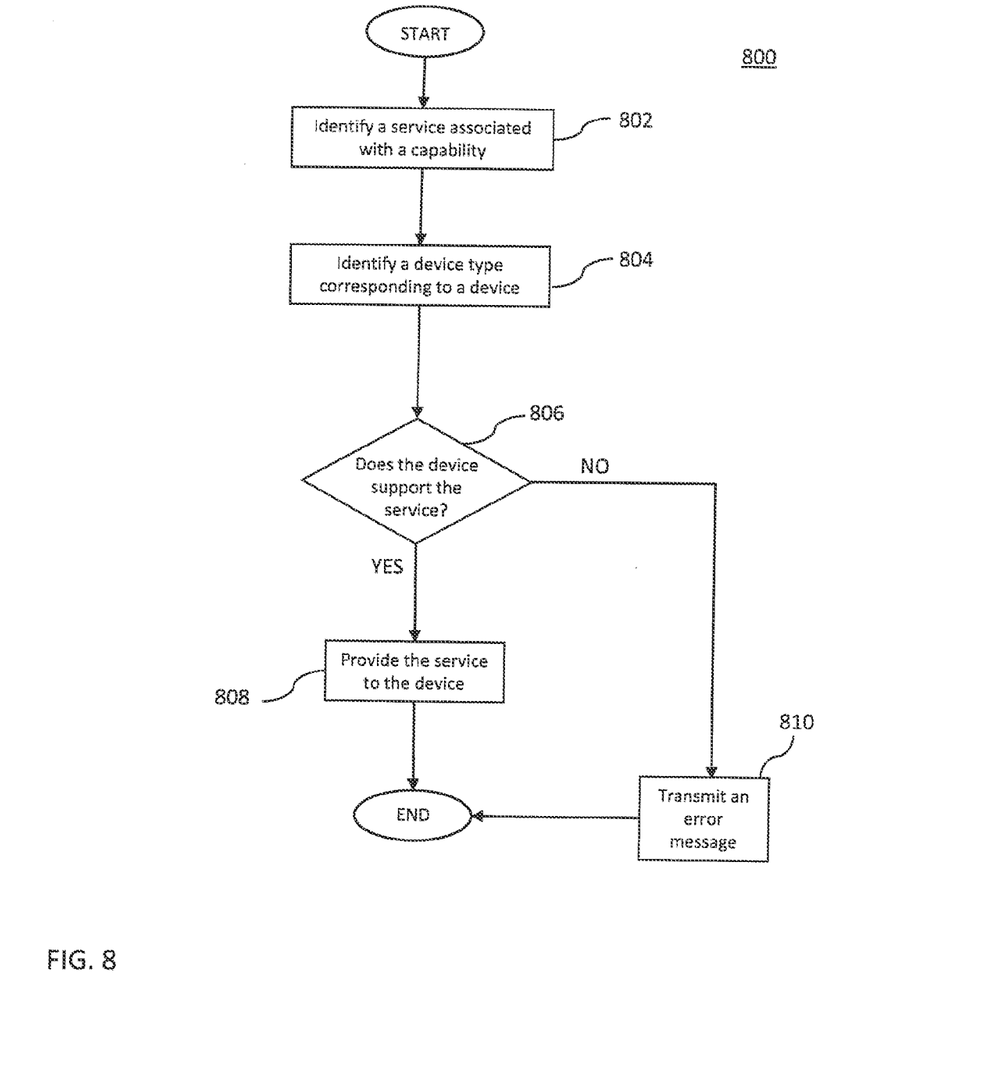
FIGS. 8, 9, and 10 are flow diagrams of exemplary routines for providing a service based on a device capability.

FIG. 8 is a flow diagram of an exemplary routine 800 for providing a service, consistent with disclosed embodiments. As described above, system 100 provides functionality enabling a fulfillment server, e.g., fulfillment server 122, to provide a service to a device, e.g., device 102, based on a capability of device 102. Routine 800 provides further details describing how fulfillment server 122 provides a service to device 102 based on a capability of device 102.

In block 802, fulfillment server 122 identifies a service associated with a capability. In such embodiments, the identified services may include, but are not limited to, providing electronic content to device 102, authenticating device 102, communicating with device 102, granting permission to device 102 to perform an action, transmitting error and/or informational messages to device 102, and any additional or alternate service apparent to one of skill in the art.

Further, as discussed above, the capability associated with the service may indicate an ability of device 102 to view, edit, save, or otherwise process a particular variety of electronic content, e.g., content that is available from fulfillment server 122. For example, the supported capability may indicate whether device 102 is compatible with a particular file format (e.g., a PDF file), whether device 102 can download specific electronic content (e.g., electronic books, newspapers, and/or magazines), and whether device 102 supports content presented at a specific visual resolution.

However, the capability is not limited to an indication of allowable content. For example, the capability may also include, but is not limited to, features of software supported by device 102, communications and/or security protocols associated with device 102, location-specific capabilities and limitations (e.g., an ability to download and/or transmits files in certain geographical regions or countries), connection-specific capabilities and limitations (e.g., an ability to downloaded electronic content when device 102 is roaming or has a poor signal), user-specific capabilities and limitations (e.g., user preferences), device-specific capabilities and limitations, or any additional or alternate capability apparent to one of skill in the art.

In step 804, fulfillment server 122 identifies a device type associated a device, e.g., device 102, based on at least information associated with the device. For example, the information associated with the device may include user information. In an embodiment, the user information may uniquely identify a user of the device, and may include, but is not limited to, an account number of the user, a personal identification number of the user, a login credential of the user, or any additional or alternate information that uniquely identifies the user of the device. In an embodiment, described above, fulfillment server 122 may transmit at least a portion of the information associated with the user to the device management server to identify the device type.

Device management server 124, upon receipt of the user information, may compare the received user information with corresponding information of records within a data store, e.g., device data store 406 of FIG. 4, to retrieve a record having user information that matches the received user information. In addition to including user information, the retrieved record may also include device information that is linked to the user information of the record. The device management server may subsequently process the retrieved record to extract the device information associated with the received record, and transmit the device information to fulfillment server 122.

As discussed above in reference to FIG. 5, the data record retrieved by device management server 124 may include device information that identifies device 102 (e.g., device information 512 of record 500). In an embodiment, device information 512 includes a device type (e.g., device type 514) associated with the user information retrieved from fulfillment server 122, and device management server 124 may extract device type 514 from the retrieved record and transmit device type 514 to the fulfillment server.

However, the retrieved record may include additional information identifying device 102, including, but not limited to a model number of device 102 (e.g., model number 516) and a serial number of device 102 (e.g., device serial no. 518). In such an embodiment, the device management server may also extract the additional identifying information from the retrieved record, and forward that extracted information to fulfillment server 122 with the extracted device type.

Once the device type is identified in block 804, fulfillment server 122 determines in block 806 whether device 102 supports the service. In an embodiment, fulfillment server 122 first processes the service to identify a capability associated with the service. The identified capability and at least the device type may then be transmitted to a device capabilities server in block 806, e.g., device capabilities server 126 of FIG. 1. Further, additional information associated with device 102, e.g., a version of an operating system executing on device 102, a model number of device 102, and a serial number of device 102, may also be transmitted to device capabilities server 126 in block 806. As discussed above, the device type, and any additional information associated with the device, may be obtained through interaction with device management server 126, and additionally or alternatively, may be received directly from device 102.

The fulfillment server may receive a response from device capabilities server 126 that, in an embodiment, indicates whether the identified device type is associated with the capability of the service. Fulfillment server 122 may then determine in block 806 whether device 102 supports the capability based on the response received from device capabilities server 126. Additional details regarding the interaction between fulfillment server 122 and device capabilities server 126 are discussed below in reference to FIG. 9.

If it is determined in block 806 that device 102 supports the capability, then fulfillment server 122 provides the service to device 102 in block 808. However, if it is determined in block 806 that device 102 does not support the service, then fulfillment server 122 may transmit an error message to device 102 in block 810 over network 130. For example, the error message may indicate that the service is not supported by device 102 and, additionally or alternatively, provide information relating to additional hardware and/or software components the facilitate access to the service. Such information may include, but is not limited to, instructions for configuring device 102 to support the service, or a link to a website or other service that provides an application program supporting the service.

In an embodiment, fulfillment server 122 may provide electronic content to device 102. For example, fulfillment server 122 may receive a request to access electronic content from device 102, and routine 800 may provide device 102 access to the requested electronic content based on a capability of device 102. The requested electronic content may include, but is not limited to, one or more of an electronic book, a digital audio file, a digital video file, a digital media file, a digital image, an application executable by device 102, and any additional or alternate electronic content apparent to one of skill in the art and appropriate to device 102.

In such embodiments, fulfillment server 122 may identify a device type associated with device 102 in step 804, and fulfillment server 122 may determine in block 806 whether device 102 supports the requested content. If it is determined in block 806 that device 102 supports the requested content, then fulfillment server 122 may provide the requested content to device 102 in block 808. However, if it is determined in block 806 that device 102 does not support the requested content, then fulfillment server 122 may discard the request and may transmit an error message to device 102 in block 810.

For example, fulfillment server 122 may transmit the requested content directly to device 102 across network 130 using one or more of the communications protocols outlined above. Further, fulfillment server 122 may allow the user of device 102 to log onto fulfillment server 122 to establish a secure communications channel through which the user of device 102 may access the requested content.

As discussed above, fulfillment server 122 may be associated with a queuing module, e.g., queuing module 312 of FIG. 3, that brokers and completes requests for content from devices in system 100. In an embodiment, fulfillment server 122 may transmit the requested content to queuing module 312 in block 808, and not directly to device 102. In such an embodiment, in block 808, fulfillment server may further transmit a message to device; 02 that instructs device 102 establish a communication session with queuing module 312 to access the requested content. For example, an application program of device 102 may allow the user of device 102 to securely log onto queuing module 312 and access the requested content without directly communicating with fulfillment server 122, in contrast with the embodiments discussed above.

Further, the user of device 102, device 102, the service, or the requested content may be associated with a protocol that limits the ability of fulfillment server 122 to provide the service to device 102, or to deliver the requested content to device 102. For example, device 102 may be associated with a user in a location that prohibits the delivery by fulfillment server 122 of a subset of available electronic content. Further, device 102 may be associated with particular security protocols or communications based protocols that, for example, block the transmission of content associated with an elevated security risk, or that that block the transmission of high-bandwidth content when device 102 has a experiences a poor wireless connection with network 130.

In such an embodiment, fulfillment server may, in block 808, identify a protocol associated with the user of the device 102, with device 102, or with the requested electronic content. Fulfillment server 122 may then filter the service or the requested electronic content based on the identified protocol, when it is determined that device 102 supports the service or requested electronic content, e.g., in block 806. For example, if the identified protocol were to block the transmission of electronic content having an elevated security risk, fulfillment server 122 may remove a portion of the requested electronic content associated with the elevated security risk, and proceed to deliver the filtered electronic content to device 102 in block 808.

Further, in an additional embodiment, fulfillment server may block the transmission of the requested electronic content when any portion of that electronic content is associated with an elevated security risk. In such an embodiment, fulfillment server 122 may transmit an error message to device 102 in block 808, instead of the potentially offending electronic content.

However, routine 800 is not limited to providing a service to device 102 upon receipt of a request for the service, e.g., a request for electronic content. In an embodiment, fulfillment server 122 may receive a request from device 102 for a particular service, and in response to the request, may identify additional services, e.g., related services, associated with the requested service. For example, fulfillment server 102 may identify that device 102 is receive notifications of available electronic content using a particular communications protocol, and further, fulfillment server 122 may identify that device 102 is configured to receive delivery of electronic content using a particular communications protocol or security protocol. In such an embodiment, fulfillment server 122 may initiate routine 800 to automatically provide such related services to device 102, either contemporaneously with the request, or at any additional or alternate time after receipt of the request.

Further, in additional embodiments, fulfillment server 122 may automatically provide a service to device 102 without any corresponding request for the service. For example, fulfillment server 122 may identify an available update to an operating system or application program executing on device 102. In such an embodiment, fulfillment server 102 may determine in step 806 that device 102 supports the identified operating system, and may automatically transmit the update to device 102 in step 808 using an appropriate communications and security protocol. The transmitted update may, in an embodiment, include executable files corresponding to the entire operating system or application program, or alternatively, may include executable files corresponding to updated modules of the operating system or application program.

Further, for example, fulfillment server 122 may automatically provide updated or current versions of authentication information to device 102 without specific requests. In an embodiment, fulfillment server 122 may obtain an updated version of a digital certificate, e.g., a SSL certificate, or an updated version of a cryptographic key, e.g., a key used in IKE exchange. Fulfillment server 122 may determine in step 806 that device 102 supports this updated authentication information, and in step 808, fulfillment server 122 may provide the updated authentication information to device 102 absent a specific request. In such embodiments, the updated authentication information may be transmitted to device 102 using an appropriate communications and security protocol.

Fulfillment server 122 may also leverage routine 800 to provide services related to device-specific actions. In an embodiment, fulfillment server may provide permissions for device 102 to perform a specific action, e.g., to post messages to a social networking or micro-blogging service such as Twitter. Moreover, fulfillment server 122 is not limited to providing the services describe above, with or without a specific request for the services. In additional embodiments, fulfillment server 122 may leverage routine 800 to provide device 102 with any of a number of additional or alternate services apparent to one of skill in the art and appropriate to a particular application.

Figure 9:
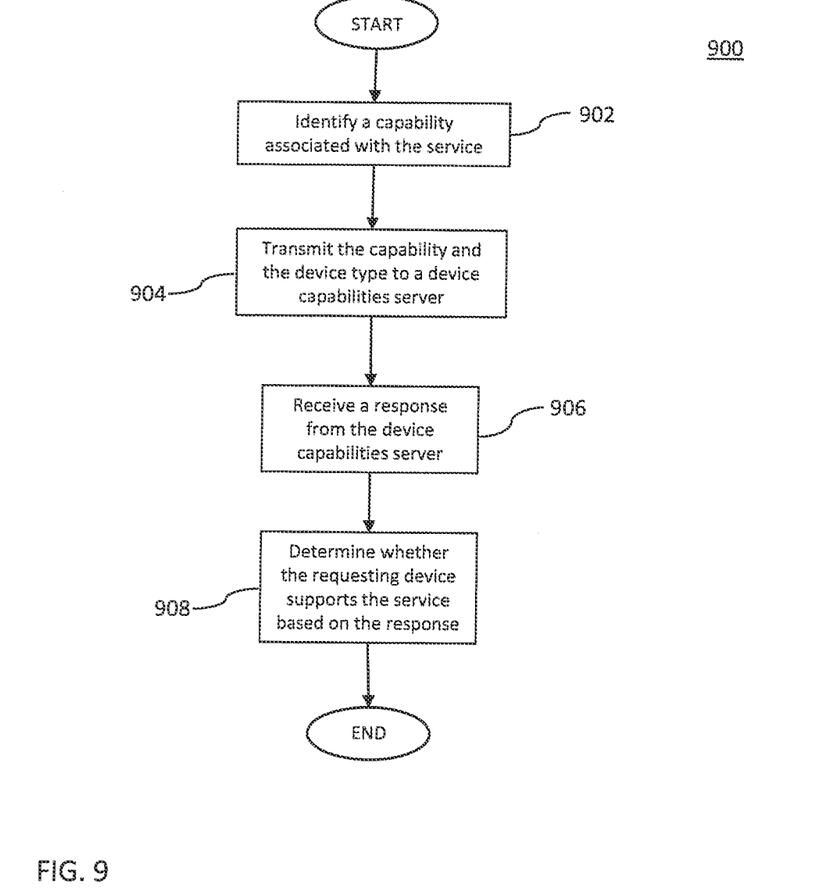

FIG. 9 is a flow diagram of an exemplary routine 900 for determining whether a device supports a service, consistent with disclosed embodiments. As discussed above in reference to block 806 of FIG. 8, fulfillment server 122 may determine whether device 102 supports the service based an interaction with device capabilities server 126. Routine 900 provides further details describing how fulfillment server 122 interact with device capabilities server 126 to determine whether device 102 supports the service.

In block 902, fulfillment server 122 identifies a capability associated with the service. For example, and as discussed above, the capability can include, but is not limited to, an indication of allowable content, indications of communications and communications mechanisms, features of software supported by device 102, security protocols associated with device 102, location-specific capabilities and limitations (e.g., an ability to download and/or transmit files in certain geographical regions or countries), connection-specific capabilities and limitations (e.g., an ability to download electronic content when device 102 is roaming or has a poor signal), user-specific capabilities and limitations (e.g., user preferences), device-specific capabilities and limitations, or any additional or alternate capability apparent to one of skill in the art.

Once the capability is identified, fulfillment server 122 may transmit in block 904 the identified capability and at least a device type associated with device 102 (e.g., the device type identified in block 804 of FIG. 8) to device capabilities server 126. Further, additional information associated with device 102 (e.g., a version of an operating system, one or more software applications supported by the operating system, or information identifying one or more hardware components) may also be transmitted to the device capabilities server 126 in block 904. As discussed above in reference to block 804 of FIG. 8, the device type, and any additional information associated with device 102, may be obtained through interaction with a device management server, and additionally or alternatively, may be received directly from device 102, or may be stored locally at fulfillment server 122.

Upon receipt of the device type and the identified capability from fulfillment server 122, device capabilities server 126 may identify and retrieve a data record associated with the device type, and with any additional information associated with the device type. Device capabilities server 126 may then determines whether the retrieved record includes the identified capability, and may generate a response to fulfillment server 122 indicative of whether the retrieved record includes the identified capability, and as such, whether the device type is associated with the identified capability.

Fulfillment server 122 may receive the response from device capabilities server 126 in block 906, and based on the response, determines in block 908 whether device 102 supports the service. For example, if the response indicates that the device type is associated with the identified capability, then fulfillment server 122 may determine in block 908 that the service is supported by device 102. In such an embodiment, routine 900 passes back to block 808 of FIG. 8, which delivers the requested content to device 102. However, if it is determined in block 908 that the device type is not associated with the identified capability, then fulfillment server 122 determines that the service is not supported by device 102. Routine 900 then returns to block 810 of FIG. 8.

Figure 10:
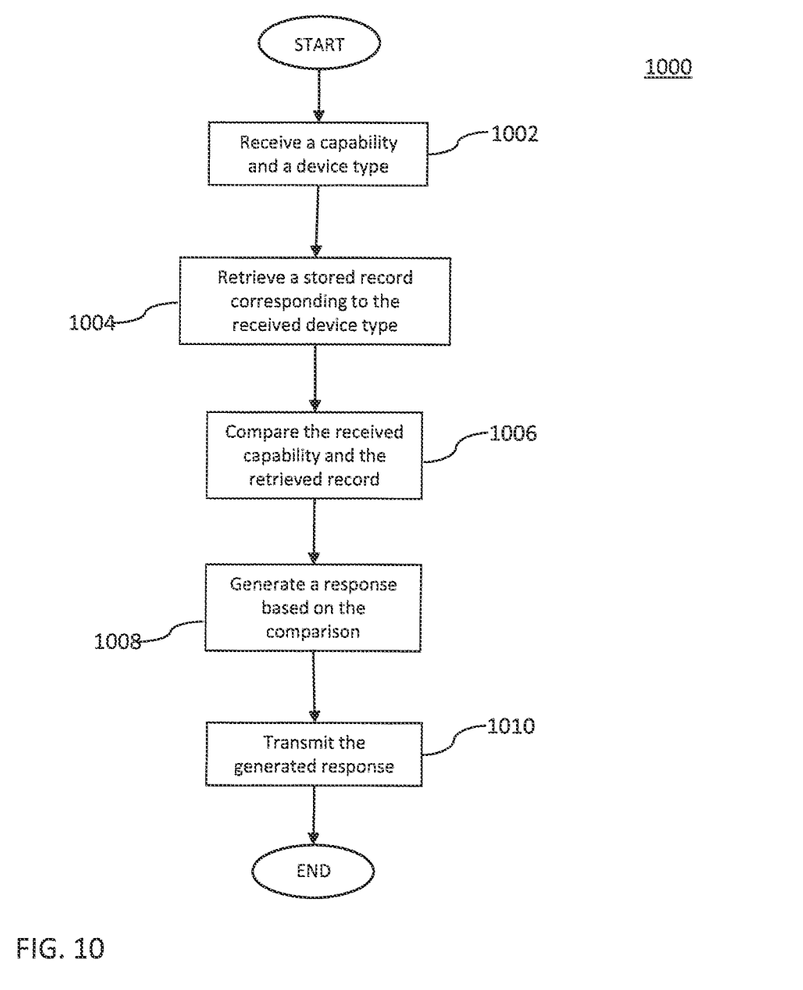

FIG. 10 is a flow diagram of an exemplary routine 1000 for associating a device type of a device with a capability of a service, consistent with disclosed embodiments. As discussed above, fulfillment server 122 queries device capabilities server 126 to determine whether device 102 supports the service. Routine 1000 provides functionality that enables device capabilities server 126 to determine whether device 102 supports the service.

In block 1002, device capabilities server 126 may receive a capability of a service and device information associated with device 102. For example, the received capability and device information may represent information transmitted from fulfillment server 122 to device capabilities server 126 in block 904 of routine 900, as discussed above in reference to FIG. 9.

As discussed above, exemplary capabilities include, but are not limited to, an indication of allowable content, indications of communications and communications mechanisms, features of software supported by device 102, security protocols associated with device 102, location-specific capabilities and limitations (e.g., an ability to download and/or transmit files in certain geographical regions or countries), licensing protocols, connection-specific capabilities and limitations (e.g., an ability to download electronic content when device 102 is roaming or has a poor signa!), user-specific capabilities and limitations (e.g., user preferences), device-specific capabilities and limitations, or any additional or alternate capability apparent to one of skill in the art Further, and as discussed above, the device information includes at least a device type associated with device 102. For example, the device type may be determined by fulfillment server 122 through an interaction with a device management server, e.g., device management server of 124 of FIG. 1, and additionally or alternative, the device may provide the corresponding device type directly to fulfillment server 122 in, for example, the request for the electronic content. In additional embodiments, the device information may also include, but is not limited to, a version of an operating system of device 102, one or more application programs supported by the operating systems, a hardware component of device 102, and any additional or alternate information apparent to one of skill in the art.

In block 1004, device capabilities server 126 may retrieve a data record associated with the received device type, and additionally or alternatively, with the received device type in combination with any additional device information. For example, device capabilities server 126 may retrieve the data record from a plurality of records stored within a corresponding data store, e.g., capabilities data store 606 of FIG. 6. Further, in an embodiment, the device type and additional device information associated of the retrieved record matches corresponding information associated with device 102 and received from fulfillment server 122 in block 1002.

Device capabilities server 126 may compare the received capability with corresponding information within the received record in block 1006 to determine whether the retrieved record includes the attribute of the retrieved record. For example, the capability of the requested content may represent an allowable file type, e.g., a PDF file, and device capabilities server 126 may compare the attribute against corresponding device capability data within the retrieved record, e.g., capabilities information 712 of FIG. 7. Device capabilities server 126 may generate a response to the fulfillment server in block 1008 that includes the results of the comparison.

As discussed above, capabilities information 712 include a capability 714 and a corresponding value 716. In an embodiment, device capabilities server 126 may determine whether the received capability matches capability 714. If it were determined that the received capability matches capability 714, the device capabilities server 126 generates a response in block 1008 that includes at least the received data type, the received attribute, and value 716 corresponding to capability 714.

Once generated in block 1008, device capabilities server 126 may transmit the response in block 1010 to fulfillment server 122. In an embodiment, the response may be transmitted over network 130 using one or more of the communications protocols discussed above. Once the response is received, fulfillment server 122 may determine whether the device supports the service, e.g., in block 908 of routine 900, based on at least the received response.

For example, if the received capability is an allowable file type of requested content, e.g., "PDF," device capabilities server 126 would match that received attribute to "PDF" capability 714, and determine that corresponding value 712 is "TRUE." As discussed above, may include, for example, the device information, at least the received capability, e.g., PDF content, and the corresponding value of "True." Further, for example, if the received capability does not match any device capability within the retrieved record, then a similar response would be generated by device capabilities server 126 in block 1008 to include, for example, the received data type, the received capability, and an indication that the retrieved attribute is not associated with the corresponding device-specific information. One of skill in the art will recognize that the response generated by device capabilities server 126 in block 1008 may include any subset of the information described above, or any additional information appropriate to the retrieved data record, the received attribute, and/or the received data type.

As one of ordinary skill in the art will appreciate, one or more of blocks 802-810, 902-908, and 1002-1010 may be optional and may be omitted from implementations in certain embodiments. Furthermore, functionality provided by one or more of blocks 802-810, 902-908, and 1002-1010 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other high-definition optical storage media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C#, etc.), Java, C++, Objective-C, HTML, HTMUA-JAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

What is claimed is:

1. A computer-implemented method comprising:
   determining, based at least in part on information associated with a device, a device type of the device, wherein the information associated with the device comprises at least one of a service account number of a user of the device, an identification number of the user of the device, a manufacturer of the device, a model number of the device, or a serial number of the device;
   determining, based at least in part on the device type, capability information associated with the device;
   transmitting, to a server, a capability request that indicates the device type and the capability information associated with the device;
   receiving, from the server, a capability response indicating that the device is capable of supporting a service; and
   providing the service to the device.

2. The computer-implemented method of claim 1, wherein determining the device type of the device comprises:
   transmitting a device request that includes the information associated with the device to an additional server; and
   receiving a device response from the additional server, the device response from the additional server indicating the device type.

3. The computer-implemented method of claim 2, wherein the device response from the additional server includes an operating system identity of an operating system of the device.

4. The computer-implemented method of claim 2, wherein the device response from the additional server further includes one or more component identities corresponding to one or more hardware components included in the device.

5. The computer-implemented method of claim 2, wherein the device response from the additional server further includes application identities of one or more application programs installed on the device.

6. The computer-implemented method of claim 1, further comprising:
   determining, based at least in part on the capability information, that the capability response indicates that the device type is associated with the capability information; and
   determining that the device supports the service.

7. The computer-implemented method of claim 1, wherein the service comprises at least one of:
   providing content to the device;
   authenticating the device; or
   communicating with the device.

8. The computer-implemented method of claim 1, wherein the capability information comprises information associated with at least one of a communications mechanism, a content delivery mechanism, a security protocol, a location-based protocol, a user-based protocol, or a device-based protocol.

9. The computer-implemented method of claim 1, further comprising:
receiving, from the device, an access request to access content; and
delivering the content to the device based at least in part on the device type.

10. The computer-implemented method of claim 9, wherein the content comprises at least one of an electronic book, a digital audio file, a digital video file, a digital media file, a digital image, or a software application to be executed by the device.

11. One or more non-transitory computer-readable storage media to store instructions executable by one or more processors to perform acts comprising:
receiving, from a device, an access request to access a service;
determining a device type of the device based at least in part on information associated with the device, wherein the information associated with the device comprises at least one of a service account number of a user of the device, an identification number of the user of the device, a manufacturer of the device, a model number of the device, or a serial number of the device;
determining, based at least in part on the device type, capability information associated with the device;
transmitting, to a server, a capability request that indicates the device type and the capability information;
receiving, from the server, a capability response indicating that the device is capable of accessing the service; and
providing the service to the device.

12. The one or more non-transitory computer-readable storage media of claim 11, wherein determining the device type of the device based on the information associated with the device comprises:
transmitting hardware information associated with the device to a second server; and
receiving a message indicating the device type from the second server.

13. The one or more non-transitory computer-readable storage media of claim 12, wherein the message identifies at least one of:
an operating system of the device;
one or more hardware components included in the device; or
one or more application programs installed on the device.

14. The one or more non-transitory computer-readable storage media of claim 11, wherein the service comprises at least one of:
providing content to the device;
authenticating the device; or
communicating with the device.

15. The one or more non-transitory computer-readable storage media of claim 11, wherein the capability information includes information associated with at least one of a communications mechanism, a content delivery mechanism, a security protocol, a location-based protocol, a user-based protocol, or a device-based protocol.

16. The one or more non-transitory computer-readable storage media of claim 11, the acts further comprising:
receiving, from the device, a content request to access content, the content comprising at least one of an electronic book, a digital audio file, a digital video file, a digital media file, a digital image, or a software application to be executed by the device.

17. A server comprising
one or more processors; and
one or more non-transitory computer-readable storage media storing instructions that are executable by the one or more processors to perform acts comprising:
receiving, from a device, an access request to access a service;
determining a device type of the device based at least in part on information associated with the device, wherein the information associated with the device comprises at least one of a service account number of a user of the device, an identification number of the user of the device, a manufacturer of the device, a model number, or a serial number of the device;
determining, based at least in part on the device type, capability information associated with the device;
transmitting, to a second server, a capability request that indicates the device type and the capability information; and
providing the service to the device based at least in part on receiving, from the second server, an indication that the device is capable of accessing the service.

18. The server of claim 17, wherein determining the device type of the device includes determining at least one of:
an operating system of the device;
one or more hardware components included in the device; or
one or more application programs installed on the device.

19. The server of claim 17, wherein the acts further comprise at least one of:
providing content to the device;
authenticating the device; or
initiating communications with the device.

20. The server of claim 17, further comprising:
receiving, from the device, a content request to access content, the content comprising at least one of an electronic book, a digital audio file, a digital video file, a digital media file, a digital image, or a software application to be executed by the device; and
providing the content to the device based at least in part on determining that the device is capable of displaying the content.

* * * * *